May 10, 1927.

B. M. SHIPLEY

CASH REGISTER

Filed May 7, 1923

Inventor
Bernis M. Shipley
By Carl Beust
Henry E Stauffer
His Attorneys

May 10, 1927.

B. M. SHIPLEY 1,628,336

CASH REGISTER

Filed May 7, 1923    6 Sheets-Sheet 2

Inventor
Bernis M. Shipley
By Earl Beust
Harry E Stauffer
His Attorneys

May 10, 1927.
B. M. SHIPLEY
CASH REGISTER
Filed May 7, 1923
1,628,336
6 Sheets-Sheet 3
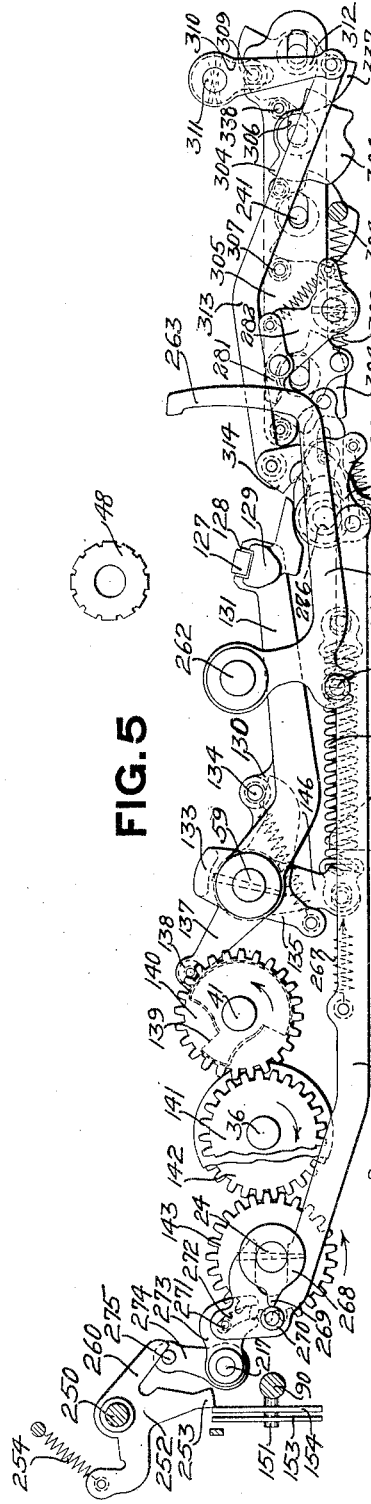
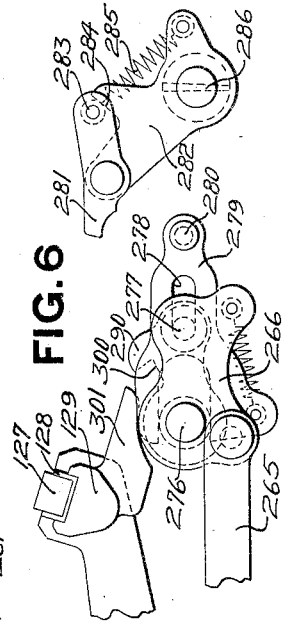
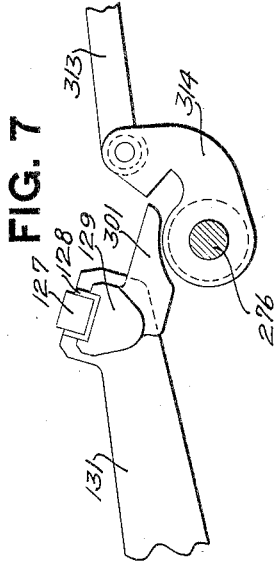
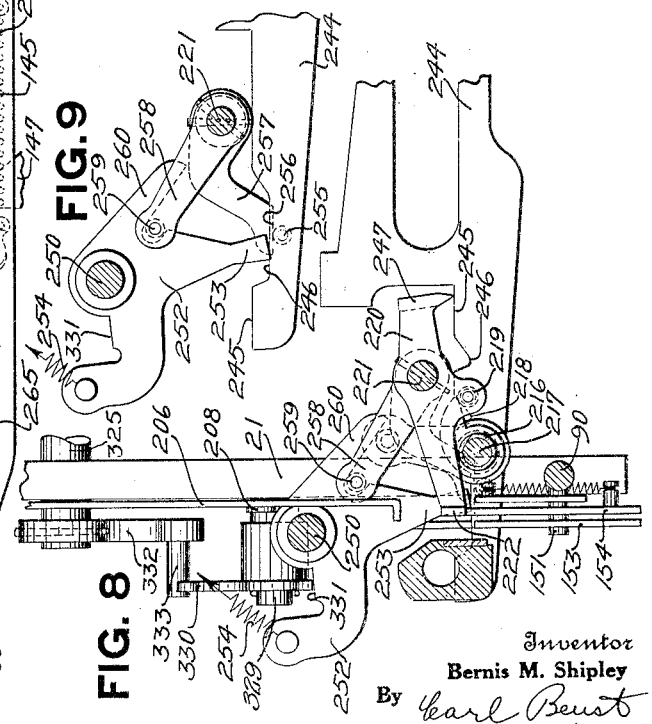
Inventor
Bernis M. Shipley
By Earl Beust
Harry E. Stauffer
His Attorney May 10, 1927.
B. M. SHIPLEY
CASH REGISTER
Filed May 7, 1923
1,628,336
6 Sheets-Sheet 4
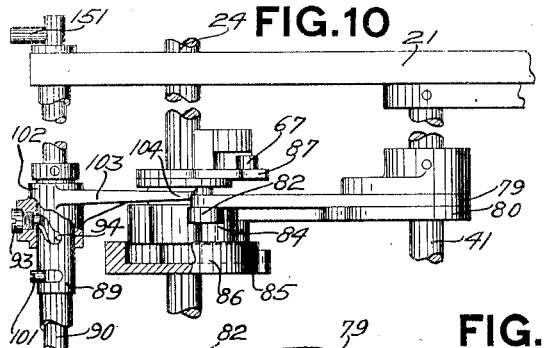
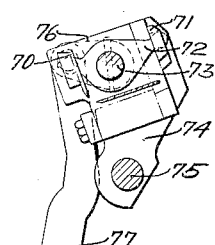
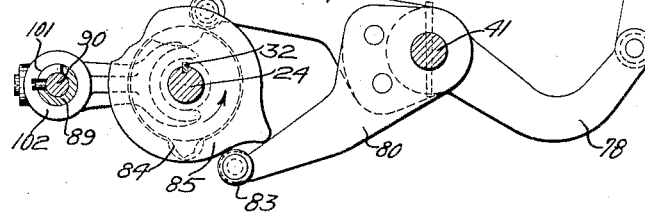
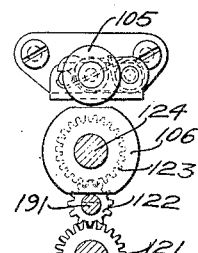
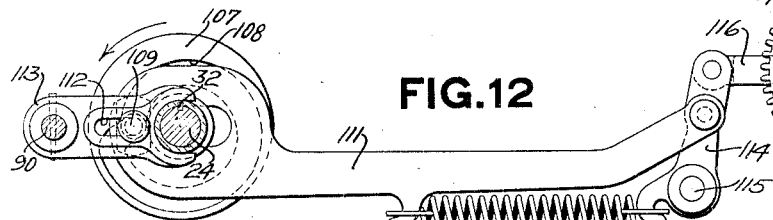
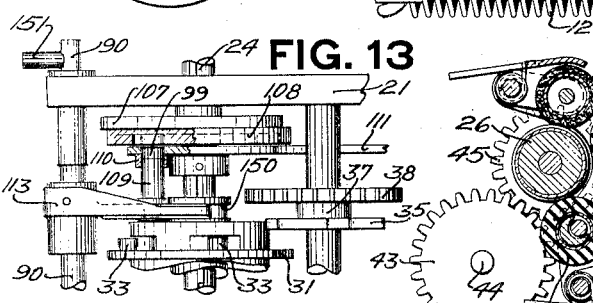
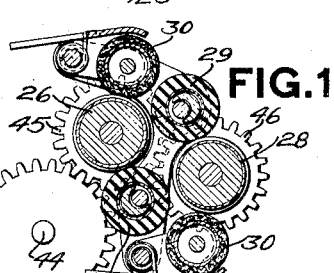
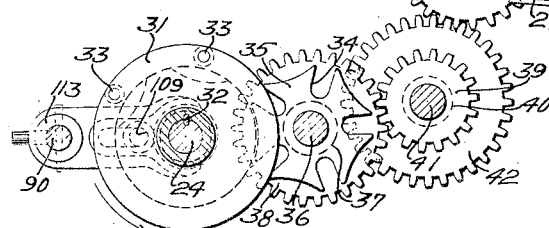
Inventor
Bernis M. Shipley
By Carl Beust
Henry E. Stauffer
His Attorney May 10, 1927.　　　B. M. SHIPLEY　　　1,628,336
CASH REGISTER
Filed May 7, 1923　　　6 Sheets-Sheet 5
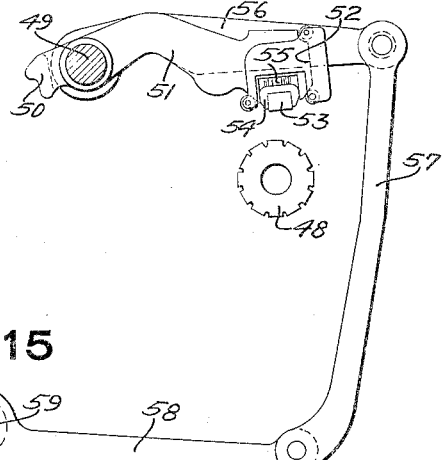
FIG. 15
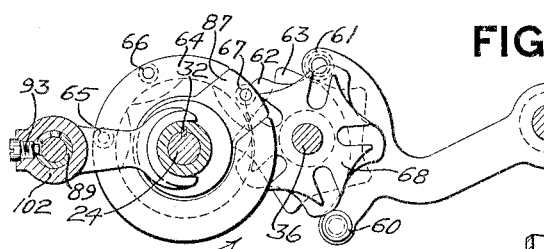
FIG. 16
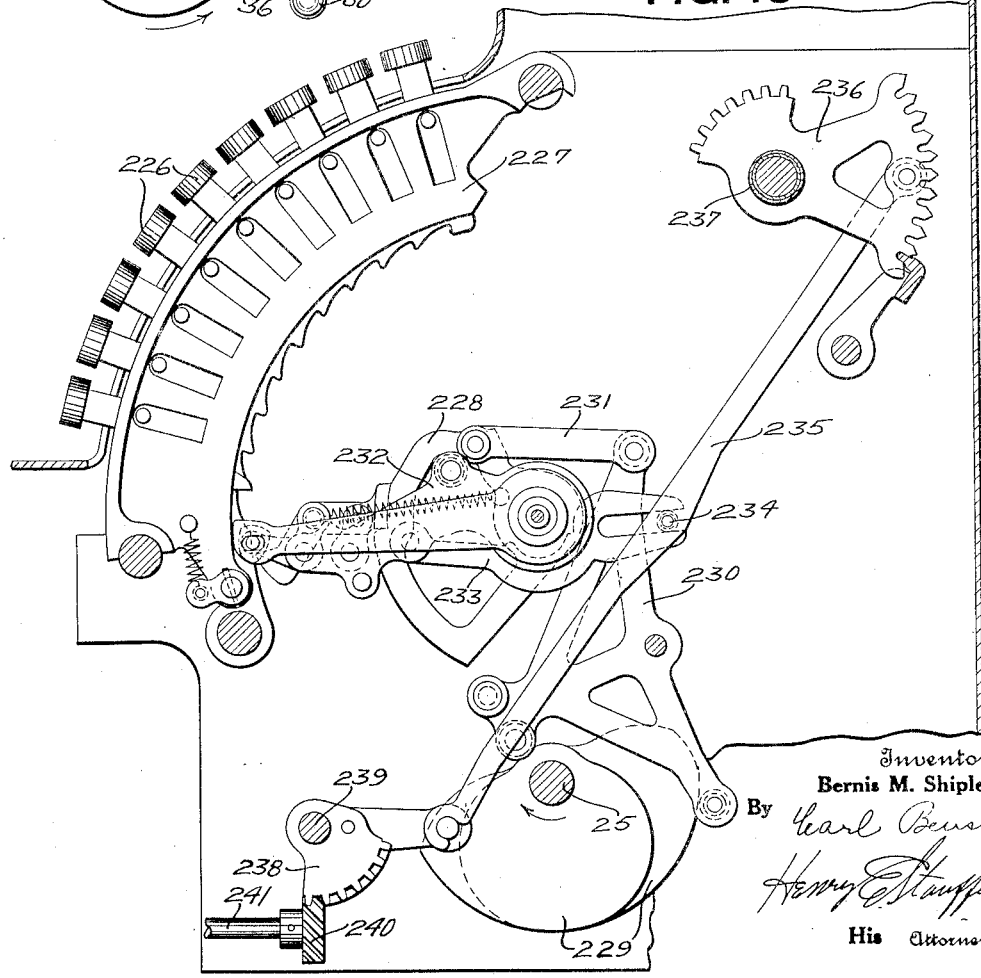
Inventor
Bernis M. Shipley
By Earl Benst
Henry E Stauffer
His Attorneys May 10, 1927.

B. M. SHIPLEY

CASH REGISTER

Filed May 7, 1923

Inventor
Bernis M. Shipley
By Carl Beust
Henry E. Stauffer
His Attorneys

Patented May 10, 1927.

1,628,336

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed May 7, 1923. Serial No. 637,216.

This machine relates to cash registers and the like, and more particularly to the printing mechanism thereof.

The principal object of the present invention is to provide a machine of the type shown herein with a variety of means by which the operation of the printer can be controlled.

With this and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 3 is a top plan view of the driving and drive-controlling mechanism of the printer.

Fig. 4 is a detail top plan view of the "on and off" and "check control" knobs. This view is a portion broken from Fig. 3.

Fig. 5 is a detail front elevation of the slip printing mechanism and the means for driving it.

Fig. 6 is an enlarged detail view of a portion of the means for disabling the slip hammer in the absence of a slip.

Fig. 7 is an enlarged detail view of a portion of the mechanism for disabling the slip hammer by the total lever and transaction keys.

Fig. 8 is a detail front elevation of the check controlling mechanism.

Fig. 9 is a detail front view of a portion of the mechanism for disabling the check printing mechanism by operation of the list key.

Fig. 10 is a detail top plan view of the mechanism for driving and controlling the knife and perforator.

Fig. 11 is a detail side elevation of the mechanism shown in Fig. 10.

Fig. 12 is a detail side elevation of the mechanism for ejecting the check from the machine.

Fig. 13 is a detail plan view of the mechanism for driving and controlling the check feeding and ejecting mechanisms.

Fig. 14 shows in side elevation the means for feeding the checks and the driving mechanism therefor.

Fig. 15 is a detail side elevation of the upper impression mechanism and the driving means therefor.

Fig. 16 is a section through the machine showing one of the transaction blanks.

Fig. 23 is a detail side elevation of one of the cams shown in Fig. 3.

Figures 1, 2:
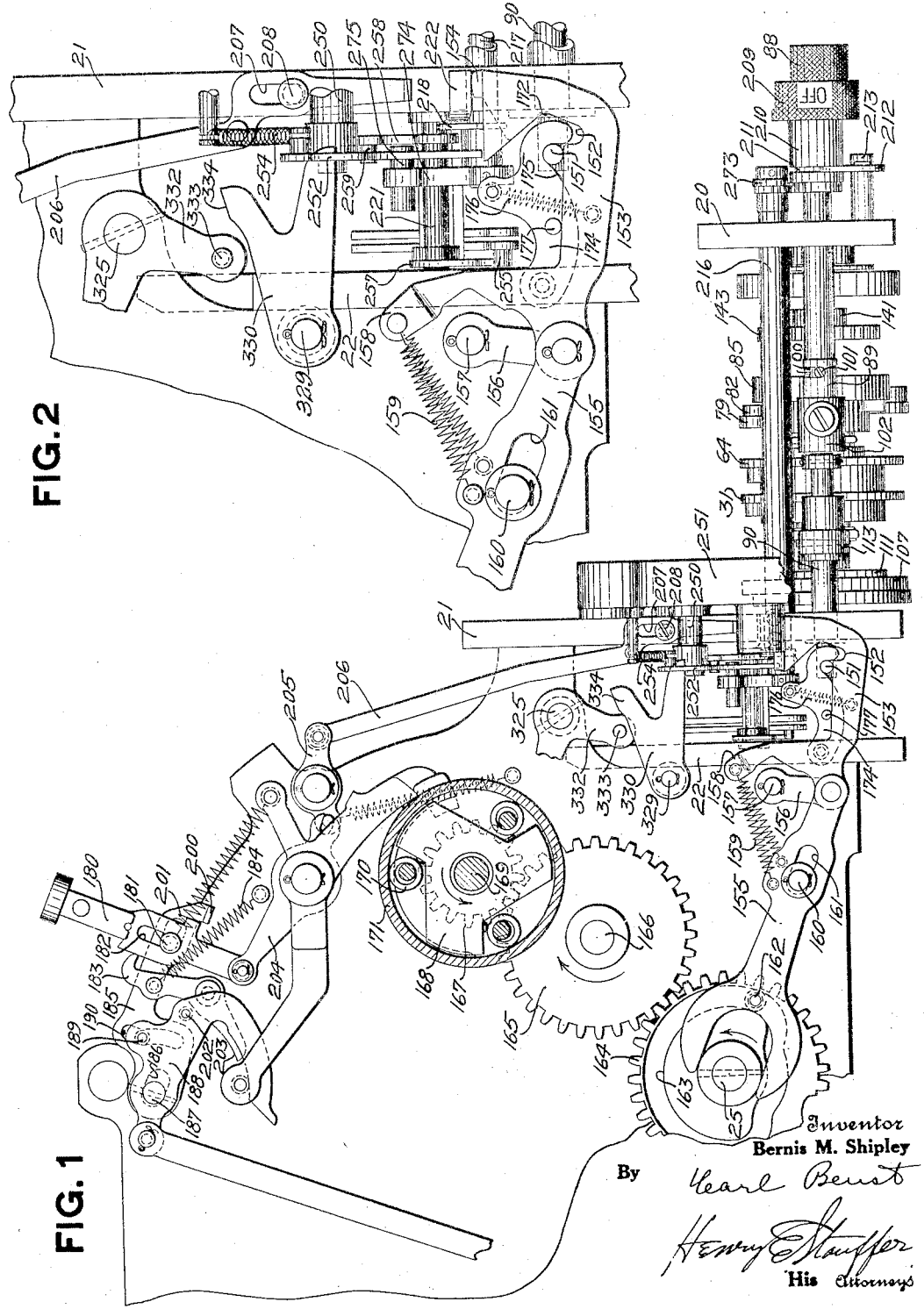
Fig. 1 is a left hand side elevation of the machine.
Fig. 2 is a detail enlarged side elevation of a portion of the mechanism shown in Fig. 1.
Figure 17:
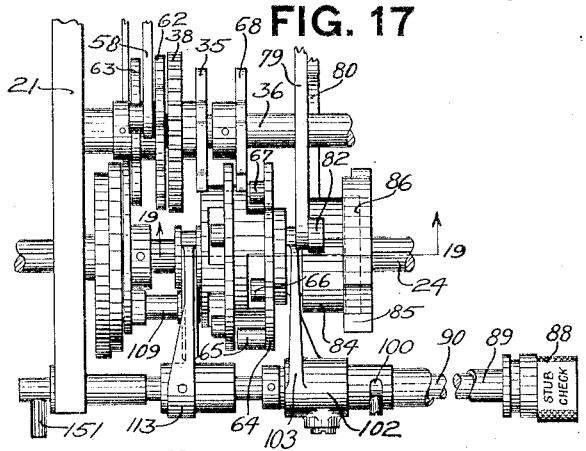
Fig. 17 is a detail plan view of a portion of the mechanism controlled by the "check control" knob shown in the position to issue a "stub check." In this figure the entire check issuing mechanism has been automatically thrown off.

This invention is shown applied to a machine of the type shown and described in United States Letters Patent No. 1,242,170 and 1,394,256, issued Oct. 9, 1917 and Oct. 18, 1921, respectively, to F. L. Fuller, and No. 1,619,796, issued Mar. 1, 1927, to B. M. Shipley.

The invention provides a plurality of means whereby the receipt, or check, as it will be called herein, will or will not be issued, as well as other means which control printing on an inserted slip.

The parts that exert a controlling influence on the check issuing mechanism are the receipt key, the total lever, the "on and off" and "check control" knobs, the transaction keys, the list key, and means controlled by the insertion or omission of a slip.

The slip printing mechanism is controlled by the transaction keys, the total lever, and the insertion or omission of a slip.

Only the portions of the machine which are novel in this application, or which cooperate therewith to produce the desired results, are shown herein. For a full description of machines of the present type reference may be made to the above mentioned patents.

Printer:—Frames.

The printing mechanism is supported by three lateral frames, a front frame 20, a middle frame 21, and a rear frame 22. These frames run entirely across the front of the machine and rest on the base (not shown) thereof.

Printer:—Driving mechanism.

The entire printer is driven by the operation of the cash register. The printer is provided with a main driving shaft 24 (Figs. 3, 5, 11, 12, 14, 15, 17 and 18) which is rotatably mounted in the printer frames and at its rear end is connected by mechanism (not shown) with the main drive shaft 25 (Figs. 1 and 16) of the cash register which is supported by the machine side frames. Due to the connecting mechanism between the register drive shaft and the printer drive shaft the latter is given only one complete counter-clockwise revolution, as seen in Fig. 14, upon every operation of said cash register.

The receipt or check issued by this machine is printed from a roll of check paper which is supported by any suitable means and which is led through guides (not shown herein) between an electroroller 26 (Fig. 14) and an impression roller 27 which are rotatably mounted on long studs extending forwardly from the frame 21. From these rollers the check paper passes between another electroroller 28 and a similar impression roller 29, also mounted on long studs. Each of the electrorollers 26 and 28 is provided with an ink roller 30 which is constantly in contact with the electrotype and thereby inks this type before the impression is made. This feeding mechanism is fully shown and described in applicant's patent before mentioned, and reference may be made thereto for a more detailed description of this mechanism.

In order to feed the check paper it is necessary to rotate the electro and impression rollers, and this is done in the following manner. A disk 31 (Figs. 3 and 14) is slidably mounted upon the main drive shaft 24 of the printer. This disk is connected to the drive shaft 24 by means of a key 32 which permits sliding movement of the disk and also transfers the movement of said shaft to the disk. Projecting laterally from the disk 31 are two pins 33 which are adapted to cooperate with slots 34 in a Geneva plate 35 loosely mounted on a shaft 36 supported by the frames 20 and 21. The Geneva plate 35 is connected by a hub 37 to a gear 38 also loose on the shaft 36. The gear 38 meshes with a smaller gear 39 which is fast on a hub 40 loose on a shaft 41 supported by the printer frames 20 and 21. Also fast on the hub 40 is a gear 42 which meshes with a gear 43 rotatably mounted on a stud 44 projecting from the middle frame 21. The gear 43 meshes with a gear 45 which is fast to the inner end of the electroroller 26, and this gear in turn meshes with a gear 46 which is fast on the inner end of the electroroller 28. It can be seen from the above description that when the main printer drive shaft 24 is given its complete counter-clockwise rotation, the pins 33 carried by the disk 31 will cooperate with the Geneva plate and rotate this plate in a clockwise direction, which movement through the hub 37 will be transmitted to the gear 38. The clockwise movement of the gear 38 will move the gear 39 and through hub 40 the gear 42 counter-clockwise. A gear 43 meshing with the gear 42 will be moved in a clockwise direction and will drive the gear 45, which is connected to the electroroller 26, in a counter-clockwise direction. The gear 46, which is connected to the electroroller 28, will therefore be moved in a clockwise direction (Fig. 14). It can thus be seen that the feeding movement of the check paper will be from left to right between the electrorollers and their cooperating impression rollers.

Printer:—Upper impression mechanism.

The printing mechanism is provided with a plurality of type wheels 48 (Figs. 5 and 15) which are differentially positioned by an operation of the cash register to an extent determined by the depression of the keys thereof. The mechanism for setting up the type wheels is well known in the art and will not be described herein. This machine is adapted to print on a record strip which remains in the machine and which will be known herein as the "detail strip." The detail strip is not shown herein, but reference may be made to any of the foregoing patents for a complete description thereof if such description is desired.

Simultaneously with effecting printing upon the check strip by the electrorollers the strip is fed to a position to receive an impression from the type wheels 48 which have been previously set up. The means for taking this impression on the check strip will now be described.

Loosely mounted on a rod 49 (Fig. 15)

projecting forwardly from the frame 21 is a yoke 50 having two arms 51 projecting toward the right and carrying a platen number 52. A platen 53 of any suitable resilient material is carried by a U-bar 54 which is in turn supported by plungers 55 slidably mounted in the platen member 52. Fast to the rear arm 51 of the yoke 50 is an arm 56 to which is pivoted one end of a link 57, pivoted at its lower end to the right hand end of a lever 58 which is loosely mounted on a shaft 59 supported by the frames 20 and 21. At its left hand end the lever 58 is bifurcated and carries a pair of anti-friction rollers 60 and 61 which are adapted to cooperate with a pair of cams 62 and 63 respectively, fast on the shaft 36. Slidably mounted on the main drive shaft 24 of the printer is a disk 64 which is driven by the shaft 24 through the medium of the key 32 before mentioned. Projecting laterally from the disk 64 are three pins 65, 66 and 67, which, when the shaft is given its counter-clockwise rotation, are adapted to cooperate with a Geneva plate 68, fast on the shaft 36. The movement of the Geneva plate 68 will be transmitted through the shaft 36 to the cams 62 and 63 and will cause the lever 58 to be rocked first clockwise and then counter-clockwise to normal position once for each pin carried by the disk 64. It can be seen that as the lever 58 moves clockwise, the platen member 52 will be lowered by means of the link 57, arm 56, yoke 50 and arms 51 to take an impression from the type wheels 48. As there are three pins on the disk 64 the platen member will be lowered three times, the first time to take an impression on the detail strip above mentioned, and the second and third times to print upon the check.

Perforator and knife.

Before the check paper reaches the printing point it is fed beneath a perforator 70 and a knife 71 (Fig. 11) loosely mounted on opposite ends of a pair of arms 72 which are pinned to a shaft 73 supported at its inner end by the frame 21 and at its outer end by an arm similar to arm 74 extending upwardly from a long stud 75 projecting forwardly from the frame 21. Also fast to the shaft 73 is an arm 76 connected to the upper end of a link 77, pivoted at its lower end to an arm 78 fast on the shaft 41. Also fast on the shaft 41 is a pair of arms 79 and 80 which are riveted together. The arm 79 carries an anti-friction roller 82 and the arm 80 carries an anti-friction roller 83 cooperating with cams 84 and 85 respectively. The cams 84 and 85 are slidably mounted on the main drive shaft 24 and are driven thereby through the key 32. It can be seen from Fig. 11 that when the shaft 24 is given its counter-clockwise rotation the arms 79 and 80, and thereby the shaft 41, will be rocked first clockwise, then counter-clockwise to normal position, and then near the end of the operation first counter-clockwise and then clockwise to normal position. This movement, through the arm 78, the link 77, and arm 76, rocks the shaft 73 first to lower the perforating blade for the purpose of perforating the check paper and then to lower the severing knife 71 to sever the check paper in a manner well known in the art and fully described in the beforementioned patents.

Stub and single check control.

This machine is adapted to issue either a single check or what is known as a "stub" check. The single check receives only one impression and is not perforated, while the stub check receives two impressions and is perforated between the impressions. A manual control is provided whereby the operator can set the mechanism to issue either a stub or a single check. This controlling mechanism will now be described. The mechanism as described thus far has been set in the position for issuing a stub check. The mechanism is shown in this position in Figs. 3, 10, 17 and 19. It is shown in the position for issuing a single check in Fig. 18. It will be remembered that the cam 84 is slidably mounted upon the main drive shaft 24. The cam 85 has a recess 86 cut therein (Fig. 19) into which it is possible to move the cam 84. When the cam 84 is in its stub check position the high point thereof will come in contact with the roller 82 (Fig. 11). This high point is only the width of the roller 82 and therefore when the cam 84 is slid toward the front on the shaft 24 the high point thereof will be moved into the recess 86 in the cam 85 and out of the path of the roller 82 on the arm 79. It can therefore be seen that when the cams 84 and 85 are given their counter-clockwise movement (Fig. 11) the arms 79 and 80 will not be rocked in a clockwise direction to lower the perforating plate 70 to perforate the check paper. The cam 85, however, still has its high point in the path of movement of the roller 83 on the arm 80 and therefore when this high point reaches the roller the arms 79 and 80 will be rocked counter-clockwise to lower the severing knife 71 and sever the check paper.

Figure 19:
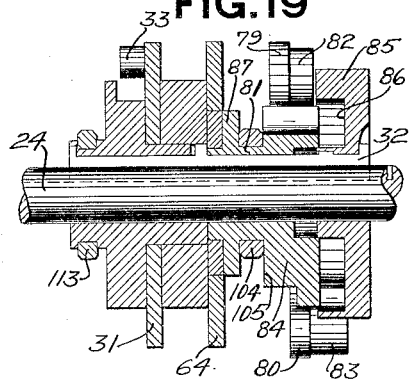
Fig. 19 is a detail sectional view of the Geneva plates and is taken on line 19—19 of Fig. 17.
Figure 18:
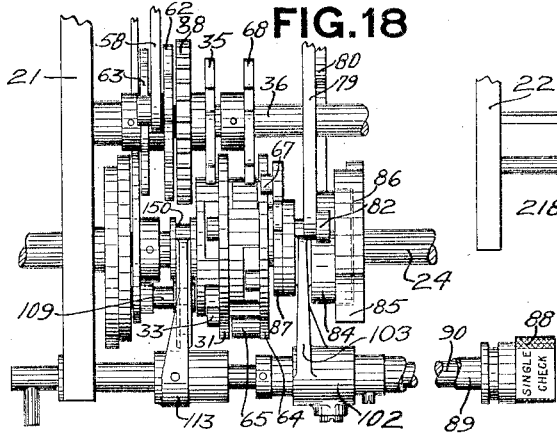
Fig. 18 shows the same mechanism as Fig. 17, but in the "single check" position.

It is also desired when a single check is to be issued that the upper impression mechanism be operated only twice, that is, once to print on the detail strip and once on the check. In order to accomplish this function, the disk 64 is provided with a portion 87 (Fig. 15) which carries the roller 67 above mentioned. The portion 87 is made integral with the cam 84 by means of a hub 81 (Fig. 19). Therefore, when the cam 84 is slid forwardly on the shaft 24 the portion 87 of the disk 64 will also be moved toward the front of the machine, which movement will remove the pin 67 from alinement with the Geneva plate 68. Therefore, when the disk 64 carrying the pins 65, 66 and 67 is rotated during an operation of the machine only the pins 65 and 66 will cooperate with the Geneva plate 68 and therefore only two impressions will be made by the upper platen 53.

The means for sliding the cam 84 and the portion 87 of the disk 64 from their stub check to their single check position will now be described. A knurled knob 88 (Figs. 1, 4, 17 and 18) projects from the front of the machine and is fast on a sleeve 89 surrounding a shaft 90 which is supported by the frames 20 and 21. A slot 100 (Fig. 3) is formed in the sleeve 89, through which projects a screw 101 fast to the shaft 90, thereby permitting the sleeve 89 to rotate about the shaft 90 but preventing any endwise movement of the sleeve on this shaft. Slidably mounted on the sleeve 89 is a hub 102 which supports an arm 103 having a bifurcated end 104 (Fig. 19) cooperating with a groove 105 cut in the hub of the cam 84 between this cam and the portion 87 of the disk 64. As can be seen from Fig. 10, the hub 102 carries a screw 93, the end of which projects into a curved slot 94 formed in the sleeve 89. It can therefore be seen that when the knurled knob 88 is turned from its stub check position to its single check position, the sleeve 89 will be rotated in a counter-clockwise direction (Fig. 11), which, by means of a curved slot 94 will slide the hub 92 toward the front of the machine, thereby carrying the portion 87 of disk 64, and cam 84 with it to the single check position.

*Ejecting mechanism.*

After the check has been printed and severed, mechanism is provided to quickly eject it from the machine. The ejecting mechanism consists of two pairs of knurled rollers 105 and 106 (Fig. 12). The rollers 106 have flat portions in their home positions so as to enable the check paper to be fed between them without difficulty. These rollers are driven in the following manner. A cam 107 (Figs. 12 and 13), fast on the shaft 24, is driven thereby in a counter-clockwise direction. The cam 107 has a groove 108 cut therein, into which projects an anti-friction roller 99 mounted on the rear end of a pin 109 which is supported by a boss 110 on the left hand end of a pitman 111 and a slot 112 formed in an arm 113 which is fast to the shaft 90. The pitman 111 is slotted and surrounds the main drive shaft 24. At its opposite end it is pivoted to an arm 114, which is pivoted on a stud 115 projecting from the frame 21. At its upper end the arm 114 is pivoted to a pitman 116 which is bifurcated and straddles a stud 117 projecting from the frame 21. The pitman 116 has a spring-pressed pawl 118 pivoted thereto which is adapted to engage with one of the teeth of a ratchet 119 loosely mounted on the stud 117 and fast to a gear 120, also loose on said stud 117. The gear 120 meshes with a gear 121, which in turn meshes with a pinion 122 fast on the shaft 191 and which cooperates with a gear 123 loose on a shaft 124. The gear 123 is fast on the rear one of the knurled rollers 106. Also fast on the shaft 191 at its forward end is a gear which is identical with the gear 122 and which cooperates with the forward one of the pair of gears 123 fast on the forward one of the knurled rollers 106. The knurled rollers 106 of course cooperate with and rotate the knurled rollers 105 above mentioned. It can be seen from the above that when the cam 107 is given its counter-clockwise revolution the pin 109 and roller 99 through cooperatoin with the cam groove 108 in said cam will move the pitman 111 toward the left (Fig. 12) thereby stretching a powerful spring 125 extending between a projecting portion of the arm 114 and a downwardly extending hook on the pitman 111. This movement of the pitman 111 will, through the arm 114, move the pitman 116 toward the left far enough to position the pawl 118 behind the next tooth of the ratchet 119. Just at the end of the operation of the machine, the pin 109 will be permitted by the cam to return to its normal position and the pitman 111 will be given a very rapid movement toward the right due to the spring 125. The pitman 111, through the arm 114, will move the pitman 116 toward the right and the pawl 118 will rotate the ratchet 119 and the gear 120 in a counter-clockwise direction. This movement will cause the gear 121 to be moved clockwise, the pinion 122 counter-clockwise, and the gear 123 and knurled rollers 106 in a clockwise direction in order to eject the severed check from the machine. A retaining pawl is provided which engages with the teeth of the ratchet and prevents any retrograde movement thereof.

*Slip printing mechanism.*

The machine to which this invention is shown attached is also designed to print upon an inserted slip. This slip is placed upon a table (not shown herein) in a position beneath the lower set of type wheels 48 (Fig. 5). These type wheels are set in the same manner and at the same time as the upper set of type wheels before mentioned, and mechanism is provided to take an impression from them upon the inserted slip. In order to accomplish this result there is provided a platen 127 (Figs. 3, 5, 6 and 7) carried by a U-bar 128 which in turn is supported by a platen-carrying member 129 carried by a pair of arms 130 and 131. The arms 130 and 131 are fast on hubs 132 which are connected and made integral by means of a yoke 133. The hubs 132 are loosely mounted upon the shaft 59 above described. The arm 131 carries a pin 134 which is held in engagement with the end of an arm 135 by means of a spring 136 extending between said pin and a pin carried by a downwardly extending portion of arm 135. The arm 135 is fast on the shaft 59. Also fast on this shaft is an arm 137 carrying an anti-friction roller 138 which is adapted to cooperate with a cam 139 loosely mounted on the shaft 41. A gear 140 is integral with the cam 139 and meshes with a gear 141 loosely mounted upon the shaft 36 but fast to the side of another gear 142 also loose on this shaft. The gear 142 in turn meshes with a gear 143 which is fast on the main drive shaft 24. When the main drive shaft 24 is given its counter-clockwise revolution the gear 143 will rotate the gear 142 and therefore the gear 141 in a clockwise direction, which movement will be transferred to the gear 140 and cam 139, rotating these parts in a counter-clockwise direction (Fig. 5). This machine differs somewhat from the machines shown in the above mentioned patents due to the fact that the hammer 127 is normally in its lower position, and when it is desired to take an impression from the lower type wheels the hammer is raised until it comes into contact therewith. The lower platen 127 constantly tends to rock counter-clockwise about the shaft 59 due to the influence of a spring 145 stretched between a downwardly extending arm 146 integral with the hub of the arm 135 and a stud projecting from the frame 21. It can therefore be seen that when the first cut-away portion of the cam 139 reaches the roller 138 the arm 137, shaft 59 and arm 135 will be rocked rapidly in a counter-clockwise direction. As the arm 135 lies under the pin 134 on the platen-carrying arm 130 the platen will also be rocked rapidly about the shaft 59 until it comes into contact with the type line.

In order to produce a good impression upon the slip the arm 135 is stopped shortly before the platen 127 comes into contact with the type by means of a lug 147 which projects upwardly from the base of the machine and lies in the path of the lower end of the arm 146.

*Check disabling mechanism.*

Mechanism is provided in this machine for disabling the check issuing mechanism under a number of different conditions which may arise in the operation of the register. It will be recalled that the various plates and cams which are carried on the main drive shaft 24 of the printer for the purpose of driving the check feeding mechanism, the upper impression mechanism, perforator and knife, are slidably mounted on this shaft. In order to disable the check issuing mechanism all that is necessary is to shift these various plates and cams toward the front of the machine a short distance. The mechanism for disabling each of these four parts of the check issuing mechanism upon the shifting movement of its appropriate driving means will now be described.

Taking first the check issuing mechanism, it can be seen from Figs. 3 and 13 that when the plate 31 carrying the operating pins 33 is slid toward the front of the machine, the pins will be removed from alinement with the Geneva plate 35 which they normally actuate, as shown in Fig. 13, and therefore the check feeding mechanism will not be operated.

The plate 64 (Figs. 3, 17, 18 and 19) which carries the pins for operating the check impression mechanism, upon the shifting movement above mentioned, will remove all except the pin 65 from alinement with the Geneva plate 68 which drives this mechanism. The pin 65 is made double the length of the pins 66 and 67 as it is desired to make one impression upon the detail strip on every operation of the machine, no matter whether a check is printed or not.

When the cams 84 and 85 (Figs. 3, 10, 11, 17, 18 and 19) which drive the perforator and knife, are moved to their forward position, both of the rollers 82 and 83 will be moved out of alinement with the high spots on their respective cams and therefore upon the rotation of the shaft 24 these cams will have no effect upon the arms 79 and 80 which actuate this mechanism.

When the mechanism above described is moved toward the front of the machine it carries with it the pin 109 (Figs. 3, 13 and 14) which normally cooperates with the cam slot 108 in the cam 107 to operate the check ejecting mechanism. Therefore, upon the rotation of the shaft 24 the pitman 111 will not be moved and the check ejecting mechanism will not be operated.

It can be seen from the above description that the check issuing mechanism is completely disabled upon the forward movement of the parts mentioned. The mechanism whereby these parts are shifted to their disabling position will now be described. It can be seen from an inspection of Figs. 3, 13, 17 and 18 that the arm 113 which is fast on the shaft 90 has a bifurcated end cooperating with a groove 150 formed in the hub of the plate 31, and from this it will be seen that any movement of the shaft 90 from front to rear will, through the arm 113 and groove 150, slide the disk 31, disk 64 together with its portion 87 and the cams 84 and 85 either forward or backward on the shaft 24. The shaft 90 at its rear end carries a pin 151 which is adapted to cooperate with a recess 152 (Fig. 1) formed in each of a pair of arms 153 and 154 (Fig. 3), which are pivoted at their rear ends to the right hand end of a pitman 155 (Fig. 2), the pivotal point being suspended on a short link 156 carried by a stud 157 mounted in the left hand side frame of the cash register. The arms 153 and 154 each have an upwardly extending projection 158 to which are fastened springs 159 stretched between these projections and two pins on the pitman 155. The projections 158 strike the stud 157 when the pitman is moved to the left, thereby disengaging the notches 152 in the arms 153 and 154 from the pin 151. Due to the action of these springs the arms 153 and 154 normally tend to rock counter-clockwise about their pivotal points for the purpose of engaging their recesses 152 with the pin 151. An arm 174 which is pivoted to the left hand end of the frame 22 has a recess 175 formed therein which engages with the pin 151 when the shaft 90 is in its inner position. This arm is held in engagement with said pin by a spring 176 stretched between a pin on said arm and a pin on arm 154. A pin 177 projects from arm 174 and engages the top edge of both arms 153 and 154 so that when either of these arms moves upward the arm 174 will be moved out of engagement with the pin 151. Pitman 155 is guided in its movement by a stud 160 projecting from the side frame through a slot 161 in said pitman. At its rear end the pitman is bifurcated and is supported by the main drive shaft 25 of the cash register. The pitman also carries a roller 162 which projects into a cam groove 163 formed in the side of a gear 164 which is fast on the shaft 25. The gear 164 meshes with a gear 165 rotatably mounted on a stud 166 in the machine side frame, and this gear in turn meshes with a pinion 167 which is fast on a clutch member 168 loosely mounted on a stud 169 projecting from the side frame. The clutch member 168 is adapted to be given a counter-clockwise rotation through the rollers 170 and shell 171 by an electric motor, as is well known in the art, and fully shown and described in the above mentioned patents.

The counter-clockwise rotation of the pinion 167 rotates the gear 165 clockwise and the gear 164 counter-clockwise. As can be seen from Fig. 1, the counter-clockwise rotation of the gear 164, due to the conformation of the cam groove 163, will move the pitman 155 first toward the left and then toward the right to normal position. It can be seen that as the pitman 155 moves toward the left, the arms 153 and 154 will accompany it, and if there is nothing to prevent they will when they reach their extreme left hand position be rocked counter-clockwise by the springs 159 to engage the recesses 152 therein with the pin 151 on the shaft 90. Then when the pitman is returned to its normal right hand position the shaft 90 will be pushed forwardly a sufficient distance to move the various plates and cams above mentioned to their disabled position.

If, at the beginning of an operation, the mechanism just mentioned is in its disabled position, upwardly extending portions 172 of the arms 153 and 154 will engage the pin 151 and when the pitman 155 is moved toward the left will slide the shaft 90 to its inner position, in which the check issuing mechanism is effective.

*Printer controls.*

It can be seen from the above that if either of the arms 153 or 154 is permitted to rise when the pitman 155 is drawn backwardly and engage the pin 151, then when the pitman 155 is moved to its forward position the shaft 90 will be slid forwardly and the check issuing mechanism will be disabled. The means for controlling the movement of the inside arm 154 will be described first.

*Mechanism for controlling issuance of check by receipt key.*

A special key 180 is provided (Fig. 1) which may be depressed in order to hold the inside arm in its lower position and thereby issue a check, providing the outside arm 153 is also held in its lowered position. The key 180 is slidably mounted on a pin 181 which projects from the machine side frame through a slot 182 in said key. The key 180 is held in its depressed position by a pawl 183 which is pivoted to the side frame and which has a nose adapted to engage with a shoulder on said key. A spring 184 stretched between a pin on said pawl and a pin on the side frame constantly tends to rock said pawl in a clockwise direction.

A member 185 is also provided to lock the receipt key in its depressed position during the operation of the machine. This member has a slot 186 cut therein through which projects the end of a shaft 187. This shaft is the release shaft of the cash register and is given a partial counter-clockwise rotation when the machine is released for operation, in a manner well known in the art. Fast on the end of this shaft is an arm 188 which has a roller 189 cooperating with a curved slot 190 in the member 185. The opposite end of this member is supported by the pin 181 which projects through a slot cut therein. When the shaft 187 is given its counterclockwise movement the member 185 will be moved towards the left (Fig. 1), which will position a bent portion 200 formed thereon over a shoulder 201 on the key and will thereby lock said key in its depressed position.

Near the end of the operation of the machine the shaft 187 is rocked clockwise to its normal position. Due to the slot and pin connection the arm 188 will move the member 185 towards the right, which movement will remove the portion 200 from the shoulder 201. The arm 188 rocks clockwise slightly past normal and when this occurs a pin 202 carried thereby will engage a tail 203 of pawl 183 and rock said pawl counter-clockwise far enough to disengage its nose from the shoulder on the key and thereby permit said key to return to normal.

Pivoted to the lower end of the key 180 is a lever 204 which is loose on a stud projecting from the machine side frame. At its opposite end the lever 204 is bifurcated and cooperates with a pin carried by one arm of a lever 205 pivoted on a stud projecting from the side frame. Pivoted to the other end of the lever is a link 206 which at its lower end has a slot 207 formed therein through which projects a pin 208 mounted in the end of frame 21.

It can be seen from the above that when the key 180 is depressed, the lever 204 is rocked counter-clockwise, which will rock lever 205 clockwise and thereby lower the link 206. This link has its end bent at right angles, and when the key 180 is depressed the bent portion will assume such a position as to prevent the inner arm 154 from being raised to engage the pin 151 and therefore a check will be issued.

*Mechanism for controlling issuance of check by on and off knob.*

Figure 20:
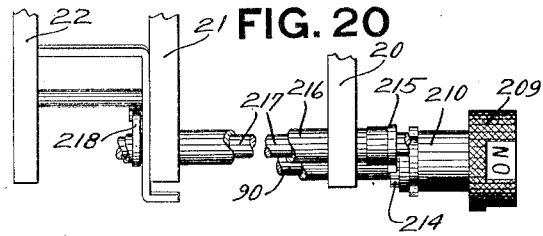
Fig. 20 is a detail top plan view of the "on and off" knob and its cooperating mechanism.

The machine is provided with a knurled knob 209 which has two positions of adjustment. In one of these positions a check will be issued and in the other the issuance will be prevented. The knob 209 is fast to a sleeve 210 (Figs. 1, 4 and 20) supported by the shaft 90. A groove 211 cut in said sleeve cooperates with a U-shaped plate 212 mounted on a stud 213 projecting from the frame 20, to hold the knob assembled. Fast to the inner end of sleeve 210 is a partial gear 214 which meshes with another partial gear 215 fast on the outer end of a sleeve 216 surrounding a shaft 217 which is rotatably mounted in the frames 20 and 21. On the inner end of the sleeve 216 is an arm 218 which when the knob is in its "on" position will contact with a pin 219 (Fig. 8) carried by a lever 220 which is loosely mounted on a shaft 221 supported by frames 21 and 22. It can be seen from Figs. 2, 3 and 8 that this lever 220 has a bent end 222 which lies over the inside arm 154. With the knob in the "on" position it is evident from Fig. 8 that the end 222 of the lever 220 will be held down by the engagement of the arm 218 with the pin 219 and therefore a check will be issued.

If, however, the knob 209 is rotated clockwise to the "off" position, the arm 218 will be rocked away from the pin 219 and the arm 154 will then be raised into engagement with the pin 151 on shaft 90 unless otherwise prevented, and upon the forward movement of this shaft the check issuing mechanism will be disabled, as has been described.

*Mechanism for controlling issuance of check by transaction keys.*

In this machine there are provided three banks of "transaction" keys 226, as is well known in the art, and fully described and shown in the patents before referred to. The keys 226 are slidably mounted in a key frame 227 and when depressed are retained in this position by a detent and locking plate (not shown).

The differential mechanism, which co-operates with each bank of transaction keys, consists of a driving segment 228 (Fig. 16) which is given first a clockwise and then a counter-clockwise movement on every operation. This segment is actuated by a pair of cams 229 fast on the main drive shaft 25. The cams 229 transmit their movement to the segment 228 by means of a Y-shaped member 230 and a link 231, as is well known in the art. Normally latched to the segment 228 is a differentially movable member 232 which is carried with the segment 228 on its clockwise movement. When the differentially movable member reaches a point corresponding to the key depressed in its bank it will be unlatched from the driving segment and will remain in its set position until picked up by the segment on its counter-clockwise movement to normal position.

Pivoted to the differentially movable member 232 is a beam 233 which is bifurcated at its rear end and cooperates with a roller 234 carried by a link 235 in such a manner as to move the link differentially. The beam is operated by a roller on the Y-shaped member 230 as usual. At its upper end the link is connected to a segment 236 which sets the indicators and through sleeves 237 selects the totalizers for operation in a very well known manner. At its lower end the link 235 is connected to a spiral segment 238 loose on a rod 239. Meshing with the segment 238 is a spiral pinion 240 fast on the inner end of a shaft 241 (Figs. 3 and 16) supported by a bracket 242 and the frames 21 and 22. Each of the shafts 241 carries a pinion 243 meshing with teeth formed on a corresponding rack 244 which runs transversely of the machine.

One of these racks is shown broken away for the sake of clearness. As shown in the beforementioned patents, these racks carry teeth which adjust the type wheels 48 differentially according to the key depressed.

At their extreme left hand ends (Figs. 8 and 9) each of the racks 244 corresponding to a transaction bank has a series of high portions 245 and low portions 246 which are adapted to cooperate with a portion 247 of the lever 220 above mentioned. This portion 247 is bent at right angles to the lever 220 and lies above all of the racks.

It will be recalled from the previous description that when the lever 220 is prevented from rocking clockwise and thereby holds the arm 154 in its lower position, a check will be issued, but if the lever 220 is permitted to rock and the arm 154 to rise, no check will be issued. It is clear, therefore, that if the combination of transaction keys depressed is such as will position all the racks 244 with low portions 246 under the portion 247 of lever 220, the lever is free to rock clockwise (Fig. 8) and thereby permit the arm 154 to rise and engage pin 151 to disable the check issuing mechanism. If, however, the racks are so positioned that a high spot 245 on any of the transaction racks lies beneath the portion 247 then it is evident that the arm 154 will be held down and that a check will be issued.

The high and low portions can be arranged in any desired manner on the racks so that any particular combination of transaction keys will either permit or prevent the issuance of a check.

*Mechanism for controlling the issuance of a check by the "list" key.*

The machine is provided with a key located in the "l" position of the first transaction bank, which key is known as the "list" key. This key is used to select a totalizer when it is desired to add a series of unrelated items and take a total thereof. It is, therefore, desired that no check be issued on operations of the machine in which the list key is depressed. The mechanism for disabling the check issuing mechanism upon such operations will now be described. Pivoted upon a stud 250 projecting rearwardly from a bracket 251 supported by the frame 21 (Figs. 1, 2, 8 and 9) is a member 252 having a downwardly extending portion 253 which when the member 252 is in position to permit the issuance of a check will lie directly over the end of the arm 153. It can be seen that with the member 252 in this position the arm 153 cannot rise and engage the pin 151 and therefore the check issuing mechanism will not be disabled. A spring 254 connected to an upwardly extending portion of the member 252 will normally rock this member in a clockwise direction. Means are provided, however, for preventing this rocking movement. Projecting laterally from the rack 244 appropriate to the first transaction bank is a pin 255 (Figs. 2 and 9) which, when the rack is in its zero position, lies just beneath a flat portion 256 formed on an arm 257 which is fast to the previously mentioned shaft 221. Also fast to the shaft 221 is an arm 258 carrying a pin 259 which engages with a projecting portion 260 of the member 252. It can be seen from the above that with the rack in its zero position the pin 255 will prevent the arm 257, shaft 221 and arm 258 from rocking in a counter-clockwise direction (Fig. 9), which will also prevent the member 252 from being rocked clockwise by its spring 254 to the position in which it will permit the issuance of a check. When the list key is depressed and the machine operated, the rack 244 which carries the pin 255 will move one step toward the right (Fig. 9), which movement is not sufficient, however, to remove the pin 255 from engagement with the surface 256 of the arm 257 and therefore through the mechanism above described the issuance of the check will be prevented by the operation of the list key. If, however, any other key in this bank is depressed the rack will move a greater distance toward the right and the spring 254 will therefore be able to rock the member 252 clockwise, as there is now no obstruction in the path of the arm 257.

*Mechanism for controlling the issuance of a check by the insertion or omission of a slip.*

In the machine shown herein mechanism is provided for printing on an inserted slip, as has already been described. It is desired that when a slip is inserted in the machine the check issuing mechanism will be disabled, and when no slip is placed in the machine this mechanism will be permitted to issue a check. Mechanism for accomplishing these results will now be described. The inserted slip is placed on a table, not shown herein, but both shown and described in the previously mentioned patents. An arm 261 (Fig. 5) is pivoted on a stud 262 projecting from the front frame 20, and has an upwardly extending portion 263 which is adapted to pass through an opening in said table. The arm 261 has a recess formed therein into which projects a pin 264 carried by a pitman 265, which at its right hand end is pivoted to a member 266, and at its left hand end is bifurcated and surrounds the main drive shaft 24 of the printer. A spring 267 is stretched between a pin on said pitman and a similar pin on the frame 20 and normally tends to pull the pitman toward the right, as seen in Fig. 5. This movement of the pitman, however, is normally prevented by a cam 268 fast on the shaft 24, which has a high spot 269 engaging with a roller 270 carried by said pitman. At the beginning of an operation of the machine the shaft 24 is rotated in a counterclockwise direction and upon this movement the high spot 269 will be removed from its engagement with the roller 270 and will permit the spring 267 to move the pitman 265 toward the right. This movement of the pitman due to its connection with the arm 261 will rock this arm counterclockwise about the stud 262 and raise the upwardly extending portion 263 thereof through the opening in the table. If, however, a slip has been placed in the machine the portion 263 will come into contact with the under side of said slip and prevent any further movement thereof as the spring 267 is not strong enough to break the paper. If, however, there is no slip in the machine the portion 263 will continue its upward movement until stopped by the engagement of the roller 270 with the periphery of the cam 268.

Projecting from the left hand end (Fig. 5) of the pitman 265 is a pin 271 which extends through a slot 272 formed in an arm 273 fast on the shaft 217 (Figs. 4 and 5). Also fast on the shaft 217 is an arm 274 carrying a pin 275 which is normally in engagement with the portion 260 of the member 252 above described. From the above description it can be seen that if no slip is placed in the machine and the pitman 265 is permitted to move to the right, the pin 271 will cooperate with the slot 272 and will thereby rock the arm 273, shaft 217 and arm 274 counter-clockwise, which movement will permit the downwardly extending portion 253 of the member 252 to assume its position above the arm 153 and thereby permit the issuance of a check. If, however, a slip is placed in the machine the link will be moved only a short distance toward the right and will then be returned to normal by mechanism to be later described, and therefore the arm 273, shaft 217 and arm 274 will remain in the position shown in Fig. 5, in which position the member 252 will not obstruct the upward movement of the arm 153 which will therefore engage the pin 151 and slide the shaft 90 forward to disable the check issuing mechanism.

The means for returning the pitman 265 to its extreme left hand position, as shown in Fig. 5, when a slip is in the machine will now be described. It will be recalled that at its right hand end the link 265 is pivoted to a member 266. This member is pivoted on a stud 276 projecting forwardly from the frame 20. The member 266 carries a pin 277 (Fig. 6) which projects through a slot 278 in a member 279. At its left hand end the member 279 is bifurcated and rests upon the stud 276. This member 279 is therefore slidable upon the pin 277 and the stud 276. At its right hand end this member carries a pin 280 which lies in the path of a pawl 281 carried by an arm 282. The pawl 281 is prevented from rocking in a clockwise direction by a pin 283 which normally engages a shoulder 284 of the arm 282. It may, however, rock in a counter-clockwise direction against the tension of a spring 285 stretched between the pin 283 and a similar pin carried by the arm 282. This arm 282 is fast on the front end of a shaft 286 which is supported by the frames 20 and 21. Fast on the shaft 286 is an arm 287 (Fig. 3) to which is pivoted the right hand end of a pitman 288 which at its left hand end has a slot formed therein through which the main drive shaft 24 extends. The pitman 288 carries an anti-friction roller which is adapted to cooperate with a cam groove cut in the side of a disk 289 fast on the shaft 24. The conformation of this cam groove (Fig. 23) is such that the pitman will be drawn first toward the left (Fig. 3), which, through the arm 287 and shaft 286, will rock the arm 282 counter-clockwise. The pitman will remain in this position until near the end of the operation of the machine, when it will be returned to its normal position. As the arm 282 rocks counter-clockwise the pawl 281 will contact with the pin 280 carried by the member 279 and will thereby rock member 279, member 266 and pitman 265 to their normal positions, as shown in Fig. 5, and will hold them in this position until shortly before the cam 268 returns to its normal position and once more engages the roller 270, whereupon the arm 282 is rocked clockwise to its normal position. The above operation takes place when there is a slip in the machine. When, however, no slip has been placed in the machine the member 266 and member 279 will be rocked together in a counter-clockwise direction far enough so that when the arm 282 carrying pawl 281 is given its counter-clockwise movement as above described the pin 280 will have been moved out of the path of said pawl. Near the end of the operation, as the parts return to their normal positions, the pin 280 will come in contact with the upper edge of the pawl 281, but due to the sliding movement of the member 279 and the flexibility of the pawl 281 they will simply brush past each other and will then resume their normal position.

*Mechanism for disabling the slip printing hammer when no slip is in the machine.*

It has been described above, how the member 266 is rocked counter-clockwise by the pitman 265 and spring 267 when there is no slip in the machine. Rigidly connected to the member 266 by means of the pin 277 is an arm 290 (Fig. 6) which has a recess 300 formed therein. When the member 266 is moved as above described, the recess 300 in arm 290 will engage with a projecting portion 301 of the slip printing hammer 129 (Figs. 3 and 6). It can therefore be seen that when there is no slip in the machine the hammer 129 will be positively held in its normal lower position and will not be rocked to take an impression from the type wheels, even though such movement is permitted by the cam 139.

*Mechanism for controlling the slip printing mechanism by the transaction keys.*

As above described there are three banks of transaction keys in this machine and it is desired to control the slip printing mechanism by these keys in such a way that any desired combination of transcation keys may either permit or prevent the printing on the slip. In order to accomplish this object, each of the shafts 241 (Figs. 3 and 5) is provided near its forward end with a cam 304 fast thereon which will be differentially set by the appropriate differential mechanism for its particular bank of transaction keys. A plate 305 has slots 306 cut therein, one for each of the shafts 241. The plate 305 carries a plurality of anti-friction rollers 307, one for each of the cams 304 and which are normally held in engagement with the peripheries of these cams by means of a spring 308 stretched between a pin on the plate 305 and a pin on the frame 21. It can be seen from Fig. 5 that each of the cams 304 is formed with high and low portions on its periphery and that when the cams are given their clockwise rotation by the differential mechanism appropriate thereto they will position either a high or a low portion thereof in contact with the rollers 307. If a high portion of any one of the cams 304 is positioned in contact with its roller 307 the plate 305 will be slid toward the left, as seen in Fig. 5. At its right hand end the plate has a recess formed therein into which projects a pin 309 carried by an arm 310 fast on a shaft 311 supported by the frames 20 and 21. Fast to the forward end of this shaft 311 is a downwardly extending arm 312 to which is pivoted a link 313 which at its other end is pivotally connected to an arm 314 (Figs. 5 and 7) loosely mounted on the stud 276. The arm 314 has a notch cut therein which is adapted to receive the projection 301 of the slip printing platen supporting member 129.

When a high spot on any of the cams 304 is brought in contact with a roller 307 the plate 305 will be slid toward the left, which will, through pin 309, arm 310, shaft 311 and arm 312, move the link 313 toward the left (Figs. 5 and 7), which will rock the arm 314 counter-clockwise and bring the notch therein into engagement with the projecting portion 301 of the lower hammer 129 thereby preventing the platen 127 from being raised into contact with the lower type wheels to take an impression therefrom.

*Totalizing.*

The machine to which this invention is shown applied is provided with mechanism for resetting any desired one of a plurality of totalizers to zero and printing the amount standing thereon on the detail strip. It is desired, however, to have both the check issuing and the slip printing mechanisms disabled on totalizing operations, and the mechanism which will now be described is to accomplish this object. The machine is provided with a total lever 315 (Fig. 21) which is integral with a plate 316 rotatably mounted in a manner well known in the art and shown and described fully in the beforementioned patents. When it is desired to take a total, the lever 315 is moved either up or down, depending upon the exact nature of the totalizing operation. A slot 317 is cut in the plate 316 and cooperates with a roller 318 carried by a lever 319 pivoted on a stud 320. Also pivoted on the stud 320 is an arm 321 which has a curved slot 322 formed therein cooperating with a roller 323 carried by an arm 324 fast on a shaft 325 supported by the side frames of the machine. The lever 319 has a lug 326 formed thereon and the arm 321 has a similar lug 327. Between these lugs, and supported thereby, extends a spring 328. It can be seen from the above that when the total lever 315 is moved either up or down, the lever 319 due to the shape of the slot 317 will be rocked counter-clockwise. This movement will be transmitted to the arm 321 by means of the spring 328, and due to the shape of the slot 322 in the arm 321 the arm 324 and shaft 325 will be rocked clockwise (Fig. 21) and counter-clockwise (Fig. 1).

Pivoted on a stud 329 projecting from the machine side frame is a two-armed member 330, the lower arm of which normally lies just above a flat portion 331 (Fig. 8) of the member 252 previously described. It will be remembered that the member 252 must be rocked clockwise to bring the downwardly extending portion 253 thereof above the arm 153 if this arm is to be prevented from engaging the pin 151 and disabling the check issuing mechanism. Therefore if the member 252 is held in the position shown in Fig. 8, due to the engagement of the member 330, it can be seen that the check issuing mechanism will be disabled. The spring 254 will rock the member 330 counter-clockwise far enough to permit the member 252 to take up its position above the arm 153 if the total lever has not been moved from its adding position. When this occurs, however, a bell crank 332 which is fast on the extreme left hand end of the shaft 325 will be rocked slightly counter-clockwise (Fig. 2) by the mechanism above described, which will cause a pin 333 carried by the downwardly extending arm of said bell crank to engage a portion 334 of the member 330 and thereby prevent any counter-clockwise movement thereof by the spring 254. Due to the above described mechanism, the member 252 will be positively held in its position, as shown in Fig. 8, and the check issuing mechanism will therefore be disabled.

Figure 22:
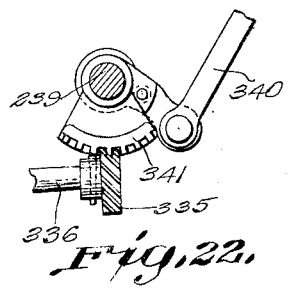
Fig. 22 shows a part of the connection between the total lever and a lower impression controlling cam.
Figure 21:
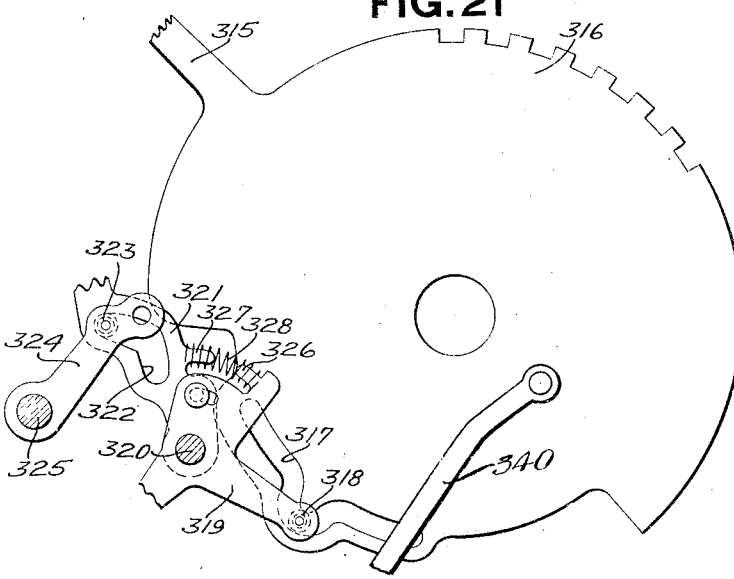
Fig. 21 is a detail side view of the total lever plate and part of its cooperating mechanism.

As shown in the above mentioned patents and in Figs. 21 and 22 the total lever is connected to and positions a spiral pinion 335 (Fig. 3) identical with the spiral pinions 240 which are differentially set by the transaction and amount banks of keys. This connection comprises a link 340 (Figs. 21 and 22), connected to a spiral pinion 341 which is in mesh with the spiral pinion 335 (Fig. 3). The pinion 335 is fast on a shaft 336 which at its opposite end (Fig. 3) carries a cam 337 which cooperates with a roller 338 carried by the beforementioned plate 305. The cam 337 is so shaped that any movement of the total lever out of its adding position will cause the roller 338 and plate 305 to be moved toward the left (Fig. 5), which as above described, will, through pin 309, arm 310, shaft 311, arm 312 and link 313, rock the arm 314 counter-clockwise far enough to bring the recess therein into engagement with the projection 301, of the member 129, which will prevent the platen 127 from operating.

It can therefore be seen that when the total lever 315 is moved out of its adding position, both the check issuing mechanism and the slip printing mechanism will be disabled and the total set up on the type wheels will be printed only on the detail strip.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of check issuing mechanism, and means adapted to be controlled by an inserted slip for preventing the issuance of a check.

2. In a machine of the class described, the combination of check issuing mechanism, driving means therefor, disconnecting means for said driving means, and means adapted to be controlled by an inserted slip for rendering the disconnecting means effective.

3. In a machine of the class described, the combination of check issuing mechanism, slidably mounted driving means therefor, and means adapted to be controlled by an inserted slip for sliding said driving means to ineffective position.

4. In a machine of the class described, the combination of check issuing mechanism, slidably mounted driving means therefor, normally effective means for sliding said driving means to ineffective position, means for preventing said sliding movement, and means adapted to be controlled by an inserted slip for disabling said preventing means.

5. In a cash register, the combination of check issuing mechanism, a plurality of slidably mounted cams for driving said issuing mechanism, means for sliding said driving cams from their effective to their ineffective positions, and a spring-pressed arm adapted to be controlled by an inserted slip for permitting sliding movement of said cams.

6. In a machine of the class described, the combination of check issuing mechanism, a plurality of slidably mounted operating members for said issuing mechanism, a pitman for sliding said members from their effective to their ineffective positions, means for connecting said pitman and said members, and means adapted to be controlled by an inserted slip for preventing said connecting means from being effective.

7. In a machine of the class described, the combination of check issuing mechanism, a plurality of slidably mounted operating members therefor, a pitman for sliding said members from their effective to their ineffective positions, a hooked arm for connecting said pitman and said members, means for holding said arm in a normally disconnected position, means for moving said arm to a connecting position during an operation of the machine, a multi-armed member adapted to prevent movement of said arm, and means adapted to be controlled by an inserted slip for disabling said multi-armed member.

8. In a machine of the class described, the combination of severing mechanism, driving means therefor, disconnecting means for said driving means, and means adapted to be controlled by an inserted slip for rendering said driving means ineffective.

9. In a machine of the class described, the combination of check perforating mechanism, a pair of slidably mounted cams for driving said perforating mechanism, means for sliding said cams from their effective to their ineffective positions, and a spring pressed arm adapted to be controlled by an inserted slip for preventing or permitting the sliding movement of said cams.

10. In a machine of the class described, the combination of printing elements, impression means cooperating therewith to print on an inserted slip, a plurality of manipulative devices, means controlled by certain of said devices for permitting said impression means to operate, and means controlled by certain other of said devices for preventing operation of said impression means.

11. In a machine of the class described, the combination of type wheels, a hammer cooperating therewith, a plurality of banks of control keys, a plurality of cams adapted to be differentially set by said banks of keys, and means controlled by said cams for preventing operation of said hammer when certain keys are depressed.

12. In a machine of the class described, the combination of type wheels, a hammer cooperating therewith, a plurality of banks of control keys, a plurality of cams adapted to be differentially set by said keys, and a single member common to all of said cams for preventing impression taking operation of said hammer upon the depression of certain keys in said control banks.

13. In a machine of the class described, the combination of type wheels, a hammer cooperating therewith, a plurality of banks of control keys, a plurality of cams adapted to be differentially set by said keys, and a single member common to all of said cams and actuated thereby, and means actuated by said single member for preventing an impression taking operation of said hammer upon the depression of certain keys in said control banks.

14. In a machine of the class described, the combination of type wheels, a hammer cooperating therewith, a plurality of banks of control keys, a plurality of cams adapted to be differentially set by said keys, and a slidable plate common to all of said cams for preventing an impression taking movement of said hammer upon the depression of certain keys in said control banks.

15. In a machine of the class described, the combination of type wheels, a hammer cooperating therewith, a plurality of banks of control keys, a plurality of cams adapted to be differentially set by said keys, and a slidable plate common to all of said cams and adapted to be actuated thereby, and means actuated by said slidable plate for preventing an impression taking movement of said hammer upon the depression of certain keys in said control banks.

16. In a machine of the class described, the combination of type wheels, a hammer cooperating therewith, a plurality of banks of control keys, a plurality of cams adapted to be differentially set by said keys, and a slidable plate common to all of said cams and adapted to be actuated thereby, normally disengaged means adapted to engage said hammer and hold it in its ineffective position, and means actuated by said slidable plate for moving said engaging means to its engaging position.

17. In a machine of the class described, the combination of type wheels, a hammer cooperating therewith to print on an inserted slip, an arm for holding said hammer in an ineffective position, a movable lever, a plurality of banks of keys, and means under the control of both of said lever and said keys for actuating said holding arm.

18. In a machine of the class described, the combination of type wheels, a hammer cooperating therewith to print on an inserted slip, an arm for holding said hammer in an ineffective position, a movable lever, a plurality of banks of keys, and a slidable plate under the control of both said lever and said keys for actuating said holding arm.

19. In a machine of the class described, the combination of type wheels, a hammer cooperating therewith to print on an inserted slip, an arm for holding said hammer in an ineffective position, a movable lever, a plurality of banks of keys, a slidable plate under the control of both said lever and said keys for actuating said holding arm, and means operated by said plate for obstructing movement of said hammer.

20. In a machine of the class described, the combination of type wheels, a hammer cooperating therewith to print on an inserted slip, an arm for holding said hammer in an ineffective position, a movable lever, a plurality of banks of keys, and cams controlled by said keys and lever for actuating said holding arm.

21. In a machine of the class described, the combination of type wheels, a hammer cooperating therewith to print on an inserted slip, an arm for holding said hammer in an ineffective position, a movable lever, a plurality of banks of keys, means controlled by said keys for actuating said arm during adding operations, and means controlled by said lever for actuating said arm in total-taking operations.

22. In a machine of the class described, the combination of impression means, means operable in the absence of impression receiving material for disabling said impression means, total-taking controlling means, a bank of keys, and means under conjoint control of said controlling means and said keys for controlling the operation of said impression means.

23. In a machine of the class described, the combination of check-issuing mechanism, a plurality of slidably mounted cams for driving said issuing mechanism, means for sliding said driving cams from their effective to their ineffective positions, means adapted to be operated by the machine to prevent said sliding movement, a total lever, and means whereby the movement of said total lever out of its normal position will disable said preventing means.

24. In a machine of the class described, the combination of check-issuing mechanism, a plurality of slidably mounted operating members for said issuing mechanism, a pitman for sliding said members from their effective to their ineffective positions, means for connecting said pitman and said members, a total lever, and means under control of said total lever for preventing said connecting means from functioning.

25. In a machine of the class described, the combination of check-issuing mechanism, a plurality of slidably mounted operating members for said issuing mechanism, a pitman for sliding said members from their effective to their ineffective positions, a total lever, and a spring pressed arm under control of said total lever for preventing or permitting said sliding movement.

26. In a machine of the class described, the combination of check-issuing mechanism, a plurality of slidably mounted operating members for said issuing mechanism, a pitman for sliding said members from their effective to their ineffective positions, a total lever, and a multi-armed member controlled by said total lever for permitting the sliding movement of said cams.

27. In a machine of the class described, the combination of check-issuing mechanism, a plurality of slidably mounted operating members for said issuing mechanism, a pitman for sliding said members from their effective to their ineffective positions, means for connecting said pitman and said members, a total lever, and means under control of said total lever for preventing said connection.

28. In a machine of the class described, the combination of check-issuing mechanism, a plurality of slidably mounted operating members for said issuing mechanism, a pitman for sliding said members from their effective to an ineffective position, a hooked arm for connecting said pitman and said members, a total lever, and a multi-armed member under control of said total lever for preventing said connection.

29. In a machine of the class described, the combination of check-issuing mechanism, a plurality of slidably mounted operating members for said issuing mechanism, a pitman for sliding said members from their effective to an ineffective position, a hooked arm for connecting said pitman and said members, means for holding said arm in a normally disconnected position, means for connecting said arm and said pitman, a total lever, and a multi-armed member under control of said total lever for preventing said connection.

30. In a machine of the class described, the combination of a printing mechanism, a driving means therefor, means spring-actuated to connect said driving means and printing mechanism, and a key for rendering said spring actuated means ineffective.

31. The combination of a printing mechanism, driving means therefor, means operable to connect and disconnect said driving means and printing mechanism, manipulative means, a rack member movable under control of said manipulative means, and a pin projecting laterally from said rack member for controlling said connecting and disconnecting means.

32. The combination of a printing mechanism, a driving means therefor, a plurality of differentially movable racks, and means cooperating with said racks for rendering the driving means effective.

33. The combination of a printing mechanism, a driving means therefor, a plurality of differentially movable notched racks, and means cooperating with the notches in said racks for rendering the driving means ineffective.

34. The combination of a printing mechanism, driving means therefor, a plurality of means for controlling the effectivity of said driving means, and a bank of keys for controlling said plurality of means.

35. In a machine of the class described, the combination of a printing mechanism, operating means therefor, total control manipulative means, differentially movable means, manipulative means for controlling said differentially movable means, a second printing mechanism, and means under control of said total control manipulative means and said differentially movable member and also controlled as an incident to an operation of said second printing mechanism for controlling the effectivity of said operating means.

36. In a machine of the class described, the combination of a printing mechanism, operating means therefor, total control manipulative means, differentially movable means, manipulative means for controlling said differentially movable means, a second printing mechanism, spring-actuated means for controlling the effectivity of said operating means, and means under control of said total control manipulative means and said differentially movable member and controlled as an incident to an operation of said second printing mechanism for restraining said spring-actuated means.

37. In a machine of the class described, the combination of a plurality of printing mechanisms, operating means therefor, means controlled by record material in position to receive a record from one printing mechanism for rendering the operating means effective to drive said last mentioned printing mechanism and ineffective as to the other printing mechanism.

38. In a machine of the class described, the combination of a printing mechanism for printing and issuing receipts, a printing mechanism for printing upon an inserted slip, and means adapted to be controlled by an inserted slip for rendering said receipt printing mechanism inoperative and said slip printing mechanism operative.

39. In a machine of the class described, the combination of a bank of keys, a receipt key, and an "on and off" knob, a receipt printing mechanism, an operating means therefor, and means controlled by said bank of keys, receipt key, and "on and off" knob, for controlling the effectivity of said operating means.

In testimony whereof I affix my signature.

BERNIS M. SHIPLEY.